July 7, 1942.        C. G. OLSON        2,289,066
FASTENER UNIT
Filed Jan. 4, 1940
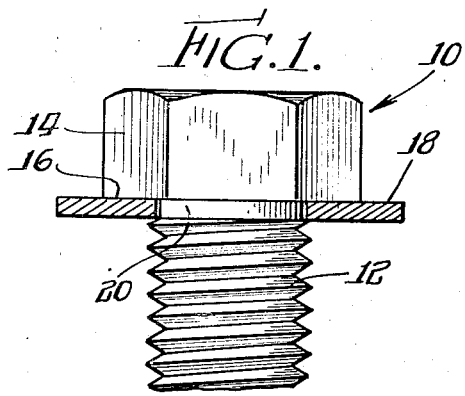
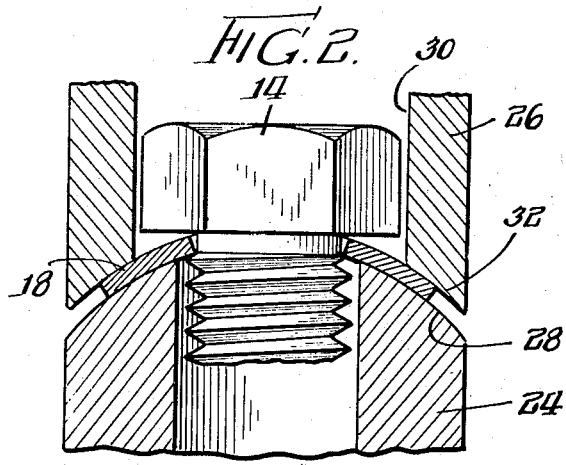
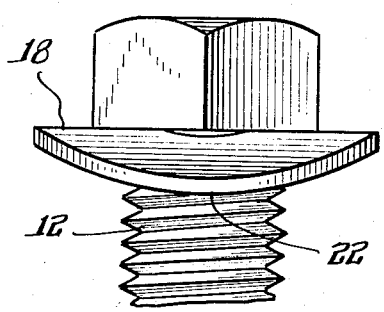
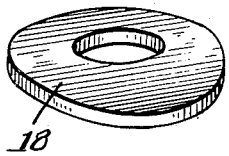
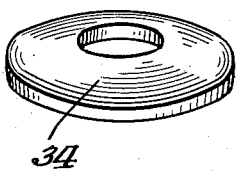
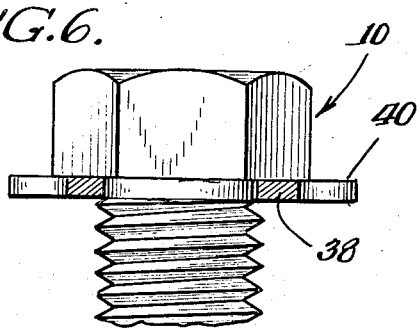
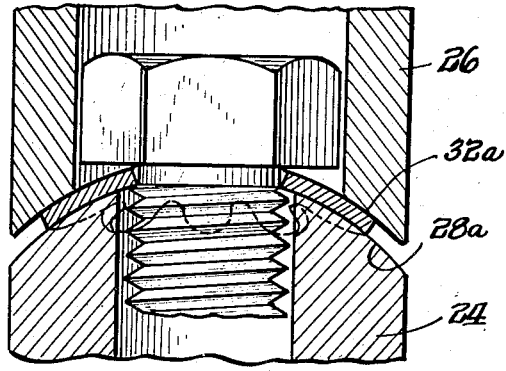
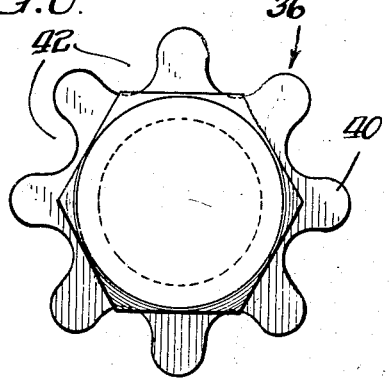
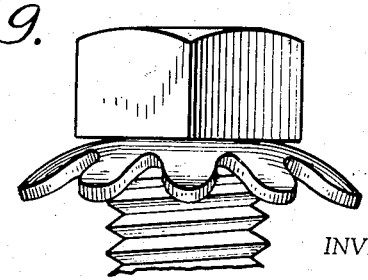
INVENTOR.
BY Carl G. Olson
Cox & Moore ATTORNEYS.

Patented July 7, 1942

2,289,066

UNITED STATES PATENT OFFICE 2,289,066

FASTENER UNIT

Carl G. Olson, Chicago, Ill., assignor to Illinois Tool Works, Chicago, Ill., a corporation of Illinois Application January 4, 1940, Serial No. 312,323

11 Claims. (Cl. 10—10)

The present invention relates to fastener units comprising spring washers and, more particularly, to the permanent association of a spring washer against the clamping surfaces of a screw head or nut.

The present invention yet more specifically contemplates the provision and production of fastener units comprising threaded fasteners wherein the washer element is retained permanently in position upon the fastener by the outwardly projecting crests of the thread sections which are formed to extend beyond the inner periphery of the washer and thus operable to axially position the washer on the fastener shank.

The invention yet additionally contemplates fastener assemblies, as above, comprising a spring washer having a continuous body portion located in an axially distorted plane, or, more specifically, in a concave, conical or other recess forming plane whereby the outer peripheral portions of the washer are axially disposed with respect to the inner marginal periphery. It will be seen that washers of the foregoing type exert a locking action through resilient frictional engagement of the inner and outer peripheral portions of the washer with the opposed clamping surfaces of the nut and work piece.

It is an important object of the present invention, therefore, to operatively associate a spring washer, as above, with the clamping surface of a fastener screw, while retaining permanent operative disposition of the parts of the elements of the assembly by means of extruded thread sections on the shank.

It will be apparent that since the full realization of all the advantages of the present assembly depends upon yieldable distortion of the concave-convex washer toward a flat plane, the threads of the screw shank must necessarily permit the clamping surfaces of the screw to approach to close juxtaposition to the opposed work surfaces. On the other hand, it will be seen that the formation of extruded washer retaining abutments on the screw shank as, for example, by the thread-rolling process, involves the utilization of laterally positioned dies which are necessarily spaced from the head of the screw a distance equal to the axial thickness of the washer in addition to such clearance as is demanded in accordance with the present operating practice. Accordingly, therefore, a washer of the above type, when assembled in accordance with the foregoing method, would normally be lacking in utility unless employed in accordance with principles necessitating a material decrease in holding efficiency of the fastener and, in the resultant assembly, the assembled washer may be shiftable axially upon the fastener shank.

It is accordingly an object of the present invention to provide an assembly of the foregoing class by bringing the washer into permanent association with the clamping surface of the fastener and by configurating the washer to provide an axially disposed portion after the formation of the thread abutments on the extruded shank for permitting the resultant holding threads to extend into desirably close association with the head of the fastener.

More specifically, in accordance with the foregoing object, the present invention contemplates the provision of an assembly, as above, where the extruded thread portions extend axially inwardly of an axial margin of the washer body for disposing the washer in close association with the work surface.

It is a yet further object of the present invention to form the assembled washer with permanently axially disposed yieldable portions hardened and elastically yieldable for maximum holding efficiency. To this end the invention contemplates the assembly and subsequent shaping or formation of suitable washer stock of moderate yield point prior to treatment of the entire assembly for conferring the hardness and elastic yieldability operable to promote high holding efficiency.

Yet another and further objects, advantages and inherent functions of the invention will become apparent as the same is more fully understood from the following description which, taken in connection with the accompanying drawing, discloses a preferred embodiment of the invention.

Referring to the drawing:

Fig. 1 is an elevational view of the upper portion of a screw and washer assembly, the washer being shown in central vertical section in order to illustrate its association with the fastener.

Fig. 2 is a view of the screw and washer shown in Fig. 1 arranged in operative position and a forming device for axially shaping the washer, the forming device being illustrated in section.

Fig. 3 is an elevational view of the completed assembly.

Fig. 4 is a perspective view of the washer of Fig. 3, the washer being shown as separate from the screw in order to more clearly illustrate the configuration thereof.

Fig. 5 is a perspective view the same as Fig. 4 of a modified, preferred form of washer.

Fig. 6 is a detail elevational view of the upper portion of a screw and washer assembly as in Fig. 1, but showing a modified form of washer.

Fig. 7 is a sectional view corresponding to Fig. 2 and showing the operation of the washer forming mechanism for axially shaping the washer of Fig. 6.

Fig. 8 is a plan view of the screw and washer assembly of Fig. 6.

Fig. 9 is a side elevational view of the screw and washer assembly after completion of the washer forming step.

Referring now to the drawing more in detail, it will be seen that the present invention contemplates association of a spring washer upon the shank of a fastener and particularly in operative association with the clamping surface of a fastener having a shank having extruded thread portions for operatively retaining the washer. One form of screw employed in accordance with the principles of the present invention is shown in Figs. 1 to 3, and designated by the numeral 10, this screw comprising a threaded shank 12 having at its upper extremity an integral extruded hexagonal head 14. The lower face of the head provides a clamping surface 16 projecting radially outwardly from the shank, as is usual with fasteners of this class.

Referring more particularly to Fig. 1, it should be noted that the washer shown and designated by the reference numeral 18 comprises a continuous annular body portion having annular inner and outer marginal peripheries.

Particular attention is directed to the fact, however, that the inner peripheral margin of the annular washed 18 is disposed about and cooperates with a washer receiving portion 20 formed on the shank 12 of the screw 10 axially intermediate of the upper extremity of the screw threads and the plane of the clamping surface 16. Yet more particularly, the diameter of the inner peripheral margin of the washer is less than the diameter of the cylindrical plane defined by the crests of the threads formed on the fastener stem or shank, whereby the threads provide, in effect, outwardly extending abutments operative to prevent axial separation of the screw and washer. It will be understood that the foregoing cooperative assembly is readily attainable in accordance with the thread extrusion process wherein the formation of the threads results in a radially outward flow of metal into the thread crests, extending outwardly beyond the normal periphery of the unthreaded shank or stem.

There is shown in Fig. 3 the assembly as it appears subsequent to the permanent formation of the washer 18 for effecting a holding action in cooperation with opposed clamping surfaces of the fastener and work piece. To this end it will be noted that the washer 18 is axially distorted out of its normal flat plane so that outer peripheral portions as at 22 are disposed axially with respect to the corresponding inner peripheral portions and project axially away from the clamping surface.

Attention is further particularly directed to the fact that the threaded portions 12 of the screw shank extend axially inwardly beyond the outer peripheral portions 22 of the washer and into relatively close juxtaposition with the clamping surface of the head 14. More particularly, in accordance with the embodiment shown, the thread extremity is separated from the clamping surface a distance not substantially greater than the thickness of the washer stock. Thus it will be apparent that the full axial extent of the threaded shank is available to exert a maximum holding force while the washer is disposed in an axially restricted location adjacent the fastener head 14. It will be seen that the locking action of a washer is accordingly available throughout elastic flexure thereof substantially to the point of complete flattening under opposed clamping stresses.

I have illustrated in Fig. 2, more or less diagrammatically, one manner in which the spring washer 18 is provided with the axial distorted configuration disclosed in Fig. 3. Thus, opposed dies 24 and 26, respectively, approach the lower and upper surfaces of the washer. It will be noted that the lower die 24 is tubular to receive the shank of the screw fastener and has an upper extremity defined by a convexly curved surface 28. The upper die members 26 are spaced as at 30 for receiving therebetween the fastener head 14. It should be particularly noted that the lower surfaces 32 of the upper die 26 reside in a curved plane complementary to the plane 28. Accordingly, therefore, as the two dies 24 and 26 move in opposition to the position shown with respect to the assembly, the washer 18 assumes the configuration illustrated. It will be understood from the foregoing that the opposed dies 24 and 26 may be associated with any suitable pressing machinery.

It is thought that it will be additionally understood from the foregoing that the material of the washer 18 consists of a suitable sheet stock adapted for permanent deformation, as above, necessitating ready distortion past the yield point. It will be understood to those skilled in the art, however, that such material is unsuited for the requirements of a spring washer of the present class which depends for its holding efficiency upon the exertion of an increasing elastic tension in cooperation with the work piece.

It should be noted that the present invention contemplates the treatment of the assembled washer to incorporate therein the necessary holding properties and I prefer to proceed by tempering the entire assembly. To this end the assembly, appearing as illustrated in Figs. 2 and 3, is heated to a suitable range and quenched in a suitable coolant. The temperature and conditions of the tempering operation will vary, as is known in the art, in accordance with the character of the washer and screw stock and the specific details thereof, need accordingly form no part of the present disclosure. In any event, the present invention contemplates suitable tempering under such conditions as to render the washer 18 elastically yieldable throughout any possible range of flexure likely to occur during utilization of the assembly, and additionally comprehends the embodiment of sufficient inherent hardness to promote biting inter-engagement of the washer periphery with the work material. Tempering may include annealing, "drawing," or other metallurgical operations for modifying the structural properties of the material and within the scope of the present specification the terms are intended to include such operations and steps.

It should be noted also, that the foregoing tempering operation may be utilized to improve the properties of the fastener 14 and, to this end, the invention further contemplates tempering under such conditions as to bring the toughness, hardness and other properties of the screw within the desired range.

I have shown in Fig. 5 a modified, preferred form of washer configuration wherein the washer is provided with a "cupped" or frusto-conical form. Thus, reference to Figs. 4 and 5 will render it apparent that the washer 34 is arranged in a plane which is concavo-convex in all radial directions, while the washer 18 is concavo-convex in one transverse section only. Thus, washer 18 is curved in one plane only, while washer 34 is curved at all intersecting planes. Thus, in the latter embodiment, the entire outer peripheral margin is available to frictionally engage the surface of the work piece, whereas the other washer provides for concentration of the holding engagement adjacent laterally opposite points on the periphery.

I have disclosed in Figs. 6 to 9 a further modified, preferred form of assembly embodying the present invention, and have illustrated, insofar as is necessary, the steps comprising the assembly process. The particular spring washer shown for purposes of illustration and represented by the reference numeral 36 comprises a continuous, annular body portion 38 provided with outer marginal projections 40 spaced by intermediate, annularly disposed notches 42.

Attention is particularly directed to the fact that in the final assembly the spring washer is arranged in a "cupped" plane similarly to the spring washer 34 hereinbefore described and, to this end, is subjected to a forming step exemplified by Fig. 7 wherein lower and upper dies 24 and 26 are provided with opposed, complementary pressure surfaces 28a and 32a which reside in spherical planes. The resultant concavo-convex washer provides an inner peripheral margin disposed against the clamping head of the screw with the outer peripheral limits of the several prongs 40 outwardly and axially spaced therefrom for multi-point engagement with the work surface. That is to say, as compared with the washer of Fig. 5, which continuously frictionally engages the work surface, the present washer engages the work surface at a series of annularly disposed points at its outer periphery. The elastic clamping stresses set up by the fastener are accordingly transmitted to and concentrated at these points for effecting maximum holding efficiency.

From the foregoing it will be apparent that the present invention provides a permanent assembly of a screw having a threaded shank and a spring washer having peripheral portions axially overlying the extremity of the threaded shank. Accordingly the present invention provides a method for assembling washers of the foregoing class wherein inner and outer peripheral portions are axially disposed or distorted for inter-engaging with opposed clamping surfaces and renders available for full utilization all of the holding advantages of this form of washer by carrying the threaded portions of the fastener axially inwardly beyond an axial margin of the washer. It should be noted furthermore that the present invention contemplates a method involving the permanent association of a screw with a washer of the above class wherein permanent association of the washer with the clamping surface of the screw is effected by utilization of the conventional thread-rolling process. The invention accordingly eliminates the need for special forming or shaping operations and thus results in the formation of the completed assembly without substantially any additional steps other than those which are required in the individual manufacture of the elements of the assembly.

It will be seen, therefore, that I have not only rendered available a special spring washer and fastener assembly, but have provided a method adaptable to low-cost, high-speed production methods.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. The method of forming an assembly comprising a screw threaded fastener having a threaded shank and a head providing a clamping surface extending outwardly from the shank, with a lock washer of the class having inner and outer marginal portions relatively axially disposed and yieldable for locking inter-engagement with a work piece which comprises axially moving a relatively flat washer to a position on the shank axially adjacent the clamping surface, extruding on the shank a helical thread having thread crests extending radially beyond the inner margin of the washer to positively prevent relative axial movement of the washer, and axially deforming the washer in its plane to bring inner and outer marginal portions into said axially disposed locking relationship.

2. The method of forming an assembly comprising a screw threaded fastener having a threaded shank and a head providing a clamping surface extending outwardly from the shank, with a lock washer of the class having inner and outer marginal portions relatively axially disposed and yieldable for locking inter-engagement with a work piece which comprises axially moving a relatively flat washer to a position on the shank axially adjacent the clamping surface, extruding on the shank a helical thread having thread crests extending radially beyond the inner margin of the washer to positively prevent relative axial movement of the washer, axially deforming the washer in its plane to bring inner and outer marginal portions into said locking relationship, and subjecting the assembly to a tempering step operative to spring harden the washer.

3. The method of forming an assembly comprising a screw threaded fastener having a threaded shank and a head providing a clamping surface extending outwardly from the shank, with a lock washer of the class having inner and outer marginal portions relatively axially disposed and yieldable for locking inter-engagement with a work piece which comprises providing an assembly comprising a washer arranged in a relatively flat plane and a screw having a shank provided with extruded thread sections extending radially beyond the inner periphery of the washer for permanently preventing relative axial displacement of the washer, and axially deforming said assembled washer to permanently axially dispose marginal portions thereof in said locking relationship for frictionally and elastically gripping opposed work surfaces when the fastener is clampingly engaged with a work piece.

4. The method of forming an assembly comprising a screw threaded fastener having a threaded shank and a head providing a clamping surface extending outwardly from the shank, with a lock washer of the class having inner and outer marginal portions relatively axially disposed and yieldable for locking inter-engagement with a work piece which comprises providing an assembly comprising a washer arranged in a relatively flat plane and a screw having a shank provided with extruded thread sections extending radially beyond the inner periphery of the washer for permanently preventing relative axial displacement of the washer, axially deforming said assembled washer to permanently axially dispose marginal portions thereof in said relatively locking relationship for frictionally and elastically gripping opposed work surfaces when the fastener is clampingly engaged with a work piece, and subjecting the formed assembly to a metallurgical tempering operation to spring-temper the washer.

5. The method of forming a screw and lock washer assembly which comprises providing a headed screw having a relatively flat washer member permanently axially disposed on the screw shank adjacent the head and positively retained against axial displacement by extruded portions of said shank projecting radially beyond the inner margin of the washer, axially deforming the assembled washer to permanently axially dispose portions thereof in relative locking relationship for gripping opposed work surfaces when the fastener is clampingly engaged with a work piece, and subjecting the assembly to a metallurgical tempering operation to spring-temper the washer.

6. The method of forming an assembly comprising a screw threaded fastener having a threaded shank and a head providing a clamping surface extending outwardly from the shank, and a lock washer of the class comprising inner an outer marginal portions relatively axially disposed and elastically yieldable toward a common plane for locking interengagement with a workpiece, which comprises axially shifting a substantially flat washer to a position on the shank in juxtaposition to the clamping surface, forming an extruded thread on said shank in close juxtaposition to said washer having its crests projecting radially beyond the inner margin of the washer to positively prevent relative axial movement of the washer from said position adjacent the clamping surface and axially deforming the washer in its plane to bring said inner and outer marginal portions into said relatively locking relation.

7. The method of forming a screw and lock washer assembly which comprises providing a fastener having a shank and a clamping surface extending outwardly from said shank, and a relatively flat lock washer permanently axially disposed upon the screw shank adjacent the clamping surface and retained against axial displacement by extruded portions of the shank projecting radially beyond the inner margin of the washer, axially deforming the assembled washer to permanently relatively axially dispose portions thereof in relative locking relationship for gripping opposed work surfaces when the fastener is clampingly engaged with a work piece.

8. In a spring washer and fastener assembly including a fastener having a shank with a helical thread formed thereon and a clamping surface projecting outwardly from said shank, a spring washer permanently secured on said shank adjacent the clamping surface, said spring washer being of the class having portions engaging with the shank adjacent the clamping surface and having other portions relatively axially spaced outwardly from said clamping surface and relatively yieldable axially toward the first named portion when clamped between said clamping surface and an opposed work surface, said thread extending axially inwardly beyond the said outer margin of the washer to a point axially in the vicinity of said inner margin and being operable to engage within a complementary threaded aperture in a workpiece when the washer yields axially.

9. In a spring washer and fastener assembly including a screw having a shank and a head at one end of said shank and including a clamping surface extending outwardly from said shank, a spring washer having an inner margin secured to the shank adjacent the clamping surface, said spring washer being of the class having an outer marginal portion axially disposed in a direction away from said head to provide inner and outer marginal portions which are axially offset, said portions being relatively yieldable axially toward a common plane when subjected to a clamping pressure in order to effect a holding action, said shank being provided with a helical thread, said thread extending axially inwardly beyond the said outer margin of the washer to a point axially in the vicinity of said inner margin and being operable to engage within a complementary threaded aperture in a workpiece when the washer yields axially.

10. In a spring washer and fastener assembly including a screw having a shank and a head at one end of said shank and including a clamping surface extending outwardly from said shank, a spring washer having an inner margin disposed on the shank adjacent the clamping surface, said spring washer being of the class having an outer marginal portion axially disposed in a direction away from said head to provide inner and outer marginal portions which are axially offset, said portions being relatively yieldable axially toward a common plane when subjected to a clamping pressure in order to effect a locking action, said shank being provided with a helical thread having its crest portions projecting outwardly beyond the inner periphery of said washer for securing the washer on the shank and permanently locating the washer in said position adjacent the clamping surface, said thread extending axially inwardly beyond the said outer margin of the washer to a point axially in the vicinity of said inner margin and being operable to engage within a complementary threaded aperture in a workpiece when the washer yields axially.

11. A lock washer and fastener assembly as defined in claim 9 wherein said washer is spring hardened after assembly.

CARL G. OLSON.